United States Patent
Miyano (10) Patent No.: US 10,854,057 B2
(45) Date of Patent: Dec. 1, 2020

(54) INFORMATION PROCESSING SYSTEM, METHOD AND COMPUTER READABLE MEDIUM FOR DETERMINING WHETHER MOVING BODIES APPEARING IN FIRST AND SECOND VIDEOS ARE THE SAME OR NOT

(71) Applicant: NEC Corporation, Tokyo (JP)

(72) Inventor: Hiroyoshi Miyano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/274,948

(22) Filed: Feb. 13, 2019

(65) Prior Publication Data

US 2019/0180584 A1 Jun. 13, 2019

Related U.S. Application Data

(63) Continuation of application No. 14/786,945, filed as application No. PCT/JP2014/061489 on Apr. 23, 2014, now Pat. No. 10,347,100.

(30) Foreign Application Priority Data

Apr. 26, 2013 (JP) ................. 2013-093849

(51) Int. Cl.
  *G08B 13/196* (2006.01)
  *H04N 7/18* (2006.01)
  *G06K 9/00* (2006.01)

(52) U.S. Cl.
  CPC ....... *G08B 13/196* (2013.01); *G06K 9/00677* (2013.01); *G06K 9/00778* (2013.01);
  (Continued)

(58) Field of Classification Search
  CPC ............ G08B 13/196; G08B 13/19645; G06K 9/00677; G06K 9/00778; G06K 9/00785; H04N 7/181
  (Continued)

(56) References Cited

U.S. PATENT DOCUMENTS 9,292,939 B2   3/2016   Mineshita
9,615,064 B2   4/2017   Millar et al.
(Continued)

FOREIGN PATENT DOCUMENTS

JP   2006-236255 A   *   2/2005
JP   2006-146378         6/2006
(Continued)

OTHER PUBLICATIONS

International Search Report and Written Opinion dated Jul. 22, 2014 in corresponding PCT International Application.
(Continued)

*Primary Examiner* — Marnie A Matt
(74) *Attorney, Agent, or Firm* — Finnegan, Henderson, Farabow, Garrett & Dunner, L.L.P.

(57) ABSTRACT

A similarity computation unit (130) derives a first probability P indicating that a first moving body appearing in the first video is the same as a second moving body appearing in the second video on the basis of similarity of feature value of the moving bodies. A non-appearance probability computation unit (140) derives a second probability Q indicating that the first moving body is not the same as the second moving body on the basis of an elapsed time after the first moving body exits from the first video. A person determination unit (150) determines whether the first moving body is the same as the second moving body by comparing the probability P and Q.

18 Claims, 9 Drawing Sheets

(52) U.S. Cl.
CPC ... *G06K 9/00785* (2013.01); *G08B 13/19645* (2013.01); *H04N 7/181* (2013.01)

(58) Field of Classification Search
USPC .......................................................... 348/154
See application file for complete search history.

(56) References Cited

U.S. PATENT DOCUMENTS

| | | |
|---|---|---|
| 2002/0196330 A1 | 12/2002 | Park et al. |
| 2003/0107649 A1 | 6/2003 | Flickner et al. |
| 2005/0185054 A1 | 8/2005 | Edwards et al. |
| 2006/0115116 A1 | 6/2006 | Iwasaki et al. |
| 2010/0231723 A1* | 9/2010 | Nam ................. G06K 9/00771 348/169 |
| 2010/0310120 A1 | 12/2010 | Keith et al. |
| 2012/0169882 A1* | 7/2012 | Millar ................... H04N 7/181 348/159 |
| 2014/0226857 A1 | 8/2014 | Mineshita |

FOREIGN PATENT DOCUMENTS

| | | |
|---|---|---|
| JP | 2006-221355 | 8/2006 |
| JP | 2006-236255 | 9/2006 |
| JP | 2008-257526 | 10/2006 |
| JP | 2009-42879 | 2/2009 |
| JP | 2011-60024 | 3/2011 |
| JP | 2012-048690 | 3/2012 |
| JP | 2013-242728 | 12/2013 |

OTHER PUBLICATIONS

Notification of Reasons for Refusal dated May 22, 2018, issued by the Japanese Patent Office in counterpart Japanese Patent Application No. 2015-513818.

Japanese Office Action dated Mar. 24, 2020, issued in counterpart Japanese Patent Application No. 2019-123022.

* cited by examiner

INFORMATION PROCESSING SYSTEM, METHOD AND COMPUTER READABLE MEDIUM FOR DETERMINING WHETHER MOVING BODIES APPEARING IN FIRST AND SECOND VIDEOS ARE THE SAME OR NOT

CROSS-REFERENCE TO RELATED PATENT APPLICATIONS

This application is a continuation of U.S. patent application Ser. No. 14/786,945, filed Oct. 23, 2015, which is a National Stage Entry of International Application No. PCT/JP2014/061489, filed Apr. 23, 2014, which claims priority from Japanese Patent Application No. 2013-093849, filed Apr. 26, 2013. The entire contents of the above-referenced applications are expressly incorporated herein by reference.

TECHNICAL FIELD

The present invention relates, in some aspects, to an information processing system, an information processing method, and a storage medium.

BACKGROUND ART

Over recent years, systems that perform monitoring over a wide range using videos captured by a plurality of video cameras (imaging apparatuses) have been devised. PTL 1, for example, discloses a monitoring system that tracks a moving body captured by each of a plurality of cameras. In the method described in PTL 1, using feature values such as brightness values, colors or the like of moving bodies extracted from respective cameras, identicalness of the moving bodies is determined.

CITATION LIST

Patent Literature

[PTL 1] Japanese Laid-open Patent Publication No. 2006-146378

SUMMARY OF INVENTION

Technical Problem

However, in the method described in PTL 1, when another moving body having a feature value similar to that of a moving body to be tracked appears in a video of a camera before the moving body to be tracked appears in the video of the camera, the another moving body may be erroneously tracked as the same moving body as the moving body to be tracked.

In view of the problem, some aspects of the present invention have been achieved, and one object of the present invention is to provide an information processing system, an information processing method, and a storage medium capable of suitably determining identicalness of moving bodies appearing in a plurality of imaging apparatuses.

An information processing system according to the present invention includes an input unit which receives inputs of videos captured by a plurality of imaging apparatuses, a detection unit which detects a moving body appearing in a first video captured by a first imaging apparatus among the plurality of imaging apparatuses and a moving body appearing in a second video captured by a second imaging apparatus among the plurality of imaging apparatuses, a first computation unit which derives, on the basis of similarity between a feature value of the moving body appearing in the first video and a feature value of the moving body appearing in the second video, a first probability indicating a probability that both moving bodies are the same, a second computation unit which derives a second probability indicating a probability that the moving body appearing in the first video does not appear in the second video on the basis of an elapsed time after the moving body exits and disappears from the first video, and a determination unit which determines whether or not the moving body appearing in the first video and the moving body appearing in the second video are the same on the basis of a comparison between the first probability and the second probability.

An information processing method according to the present invention includes receiving inputs of videos captured by a plurality of imaging apparatuses, a step of detecting a moving body appearing in a first video captured by a first imaging apparatus among the plurality of imaging apparatuses and a moving body appearing in a second video captured by a second imaging apparatus among the plurality of imaging apparatuses, deriving, on the basis of similarity between a feature value of the moving body appearing in the first video and a feature value of the moving body appearing in the second video, a first probability in which both moving bodies are the same, deriving a second probability in which the moving body appearing in the first video does not appear in the second video on the basis of an elapsed time after the moving body exits and disappears from the first video, and determining whether or not the moving body appearing in the first video and the moving body appearing in the second video are the same on the basis of a comparison between the first probability and the second probability.

A non-transitory computer readable storage medium recording thereon a program according to the present invention that causes a computer to execute processing for receiving inputs of videos captured by a plurality of imaging apparatuses, processing for detecting a moving body appearing in a first video captured by a first imaging apparatus among the plurality of imaging apparatuses and a moving body appearing in a second video captured by a second imaging apparatus among the plurality of imaging apparatuses, processing for deriving, on the basis of similarity between a feature value of the moving body appearing in the first video and a feature value of the moving body appearing in the second video, a first probability in which both moving bodies are the same, processing for deriving a second probability in which the moving body appearing in the first video does not appear in the second video on the basis of an elapsed time after the moving body exits and disappears from the first video, and processing for determining whether or not the moving body appearing in the first video and the moving body appearing in the second video are the same on the basis of a comparison between the first probability and the second probability.

In the present invention, "unit", "means", "device", or "system" does not refer simply to physical means but includes a case in which a function possessed by the "unit", "means", "device", or "system" is realized with software. It is also possible that a function of one "unit", "means", "device", or "system" is realized with two or more physical means or devices, or alternatively functions of two or more "units", "means", "devices", or "systems" are realized with one physical means or device.

Advantageous Effects of Invention

According to the present invention, it is possible to provide an information processing system, an information processing method, and a program capable of suitably determining identicalness of moving bodies appearing in a plurality of imaging apparatuses.

DESCRIPTION OF EMBODIMENTS

Exemplary embodiments of the present invention will be described below. In the following description and the illustration of the drawings referred to, identical or similar reference signs are assigned to identical or similar configurations, respectively.

1 First Exemplary Embodiment

FIG. 1 to FIG. 6 are figures for illustrating a first exemplary embodiment. Referring to these figures, the present exemplary embodiment will be described along the following flow. Initially, in "1.1", an outline of a determination method of a moving body according to the present system is described. Then, in "1.2", an outline of a functional configuration of a system, in "1.3", a flow of processing, and in "1.4", a specific example of a hardware configuration where the present system is mountable are illustrated. Lastly, in "1.5" and thereafter, advantageous effects according to the present invention and others are described.

(1.1 Outline)

The present exemplary embodiment relates to a system that tracks a motion of a moving body, for example, by analyzing videos captured by a plurality of imaging apparatuses (e.g. monitoring cameras) having imaging ranges different from each other. Therefore, in the system according to the present exemplary embodiment, when a moving body determinable to be the same as a moving body having exited and disappeared from a first imaging range appears in a second imaging range, both moving bodies are associated as the same moving body. In other words, the present system determines identicalness of moving bodies.

Figure 1A:
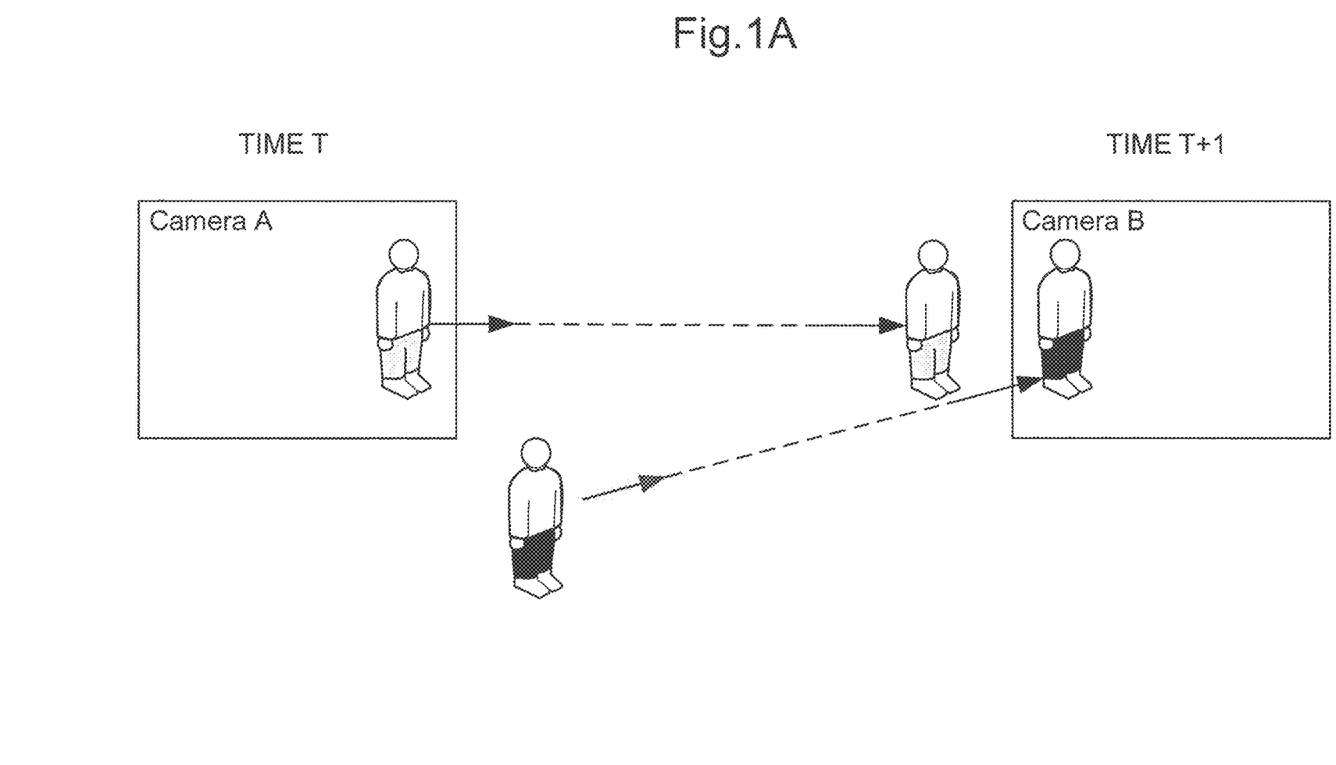
FIG. 1A is a diagram illustrating a specific example of a video of a video camera.
Figure 1B:
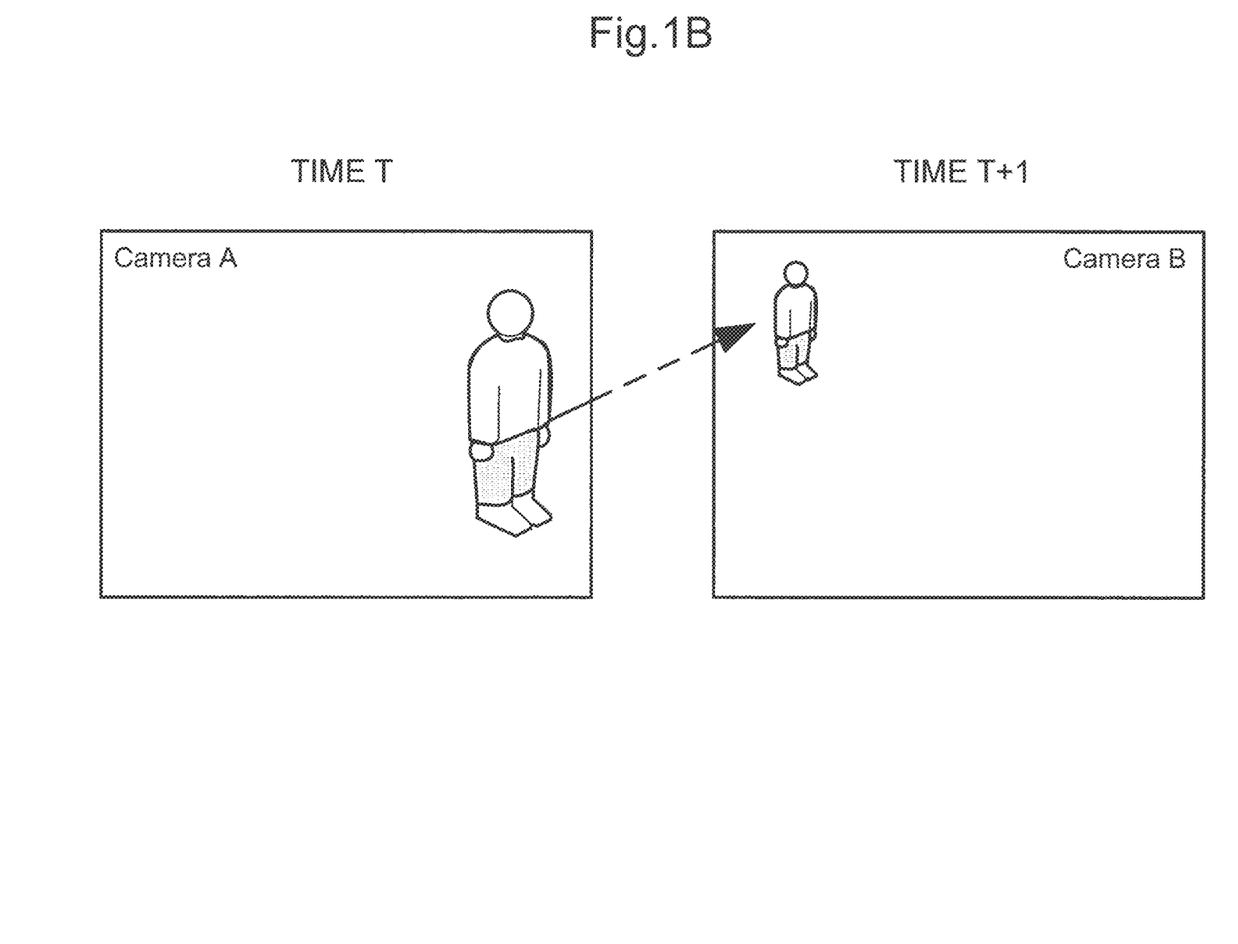
FIG. 1B is a diagram illustrating a specific example of a video of a video camera.

As specific examples of the moving body, a person, a car, a motorcycle, a bicycle, and the like are conceivable. However, in the following description, a case in which a person is tracked is mainly described. Referring to FIG. 1A and FIG. 1B, a determination method for identicalness of persons appearing in videos is considered below.

To determine identicalness of persons, conceivable is a method in which, for example, from images of persons appearing in respective videos, feature values such as brightness values or colors are extracted and then persons having similarity of the feature values higher than a threshold are determined as the same person.

However, as illustrated in FIG. 1A, upon tracking a person appearing in a video of a camera A at a time T, when at a time T+1, a person having high similarity to a person to be tracked appears first in a video of a camera B although the person to be tracked has not yet appeared in the video (has not yet arrived at an imaging range) of the camera B, the person may be erroneously determined as the person to be tracked.

To prevent such an erroneous association, a method in which a threshold for a same person determination based on similarity is set to be high is also conceivable. However, when the threshold is set to be high, it is highly possible that a determination for the same person is not performed even when a person to be tracked appears.

As illustrated in FIG. 1B, for example, a case where the camera A and the camera B are close to each other and a probability in which a person other than a person to be tracked appears in the camera B is low is assumed. In this case, when a threshold for a similarity determination is excessively high even though a highly accurate feature value is unable to be acquired, for example, due to the fact that a person appears small or at a different angle, a person appearing in the camera B is not determined to be the same as a person to be tracked.

Therefore, in the system according to the present exemplary embodiment, person tracking (association of persons) between cameras is performed, considering not only similarity but also a probability in which a tracking target does not appear. Detailed description is made below.

It is assumed that when a person appears in a video of the camera B after t second elapsed after a person to be tracked exits and disappears from a video of the camera A, a probability in which the person to be tracked and the person appearing in the video of the camera B are the same person, the probability being computed on the basis of image information, is designated as P. P is computed, for example, on the basis of a degree of similarity between a feature value of a tracking target person image (hereinafter, also referred to simply as "a feature value of a person") in a video of the camera A and a person of a video appearing in the camera B, and the like. As the feature value, various types of values such as a color or brightness, a shape, a posture, and a histogram thereof are conceivable.

Further, it is assumed that a probability in which a person to be tracked is considered to have not yet appeared in a video of the camera B is designated as Q. Q is a function employing an elapsed time t after exiting and disappearing from a video of the camera A as at least a part of variables, and Q is a monotonously non-increasing function with respect to t. Further, a decreased width of Q(t) differs, depending on a distance between an imaging range of the camera A and an imaging range of the camera B.

Figure 2A:
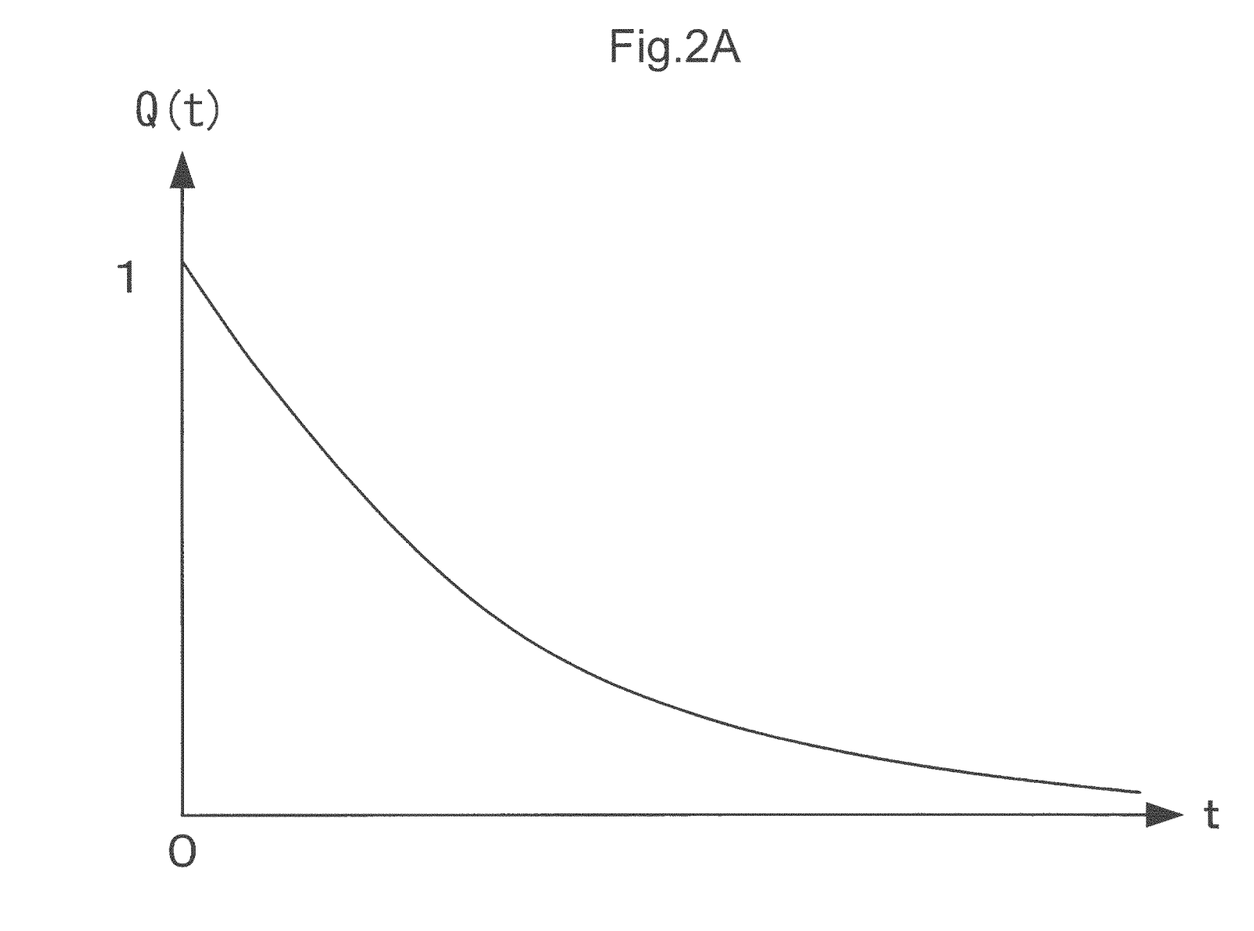
FIG. 2A is a chart illustrating a specific example of non-appearance probability.
Figure 2B:
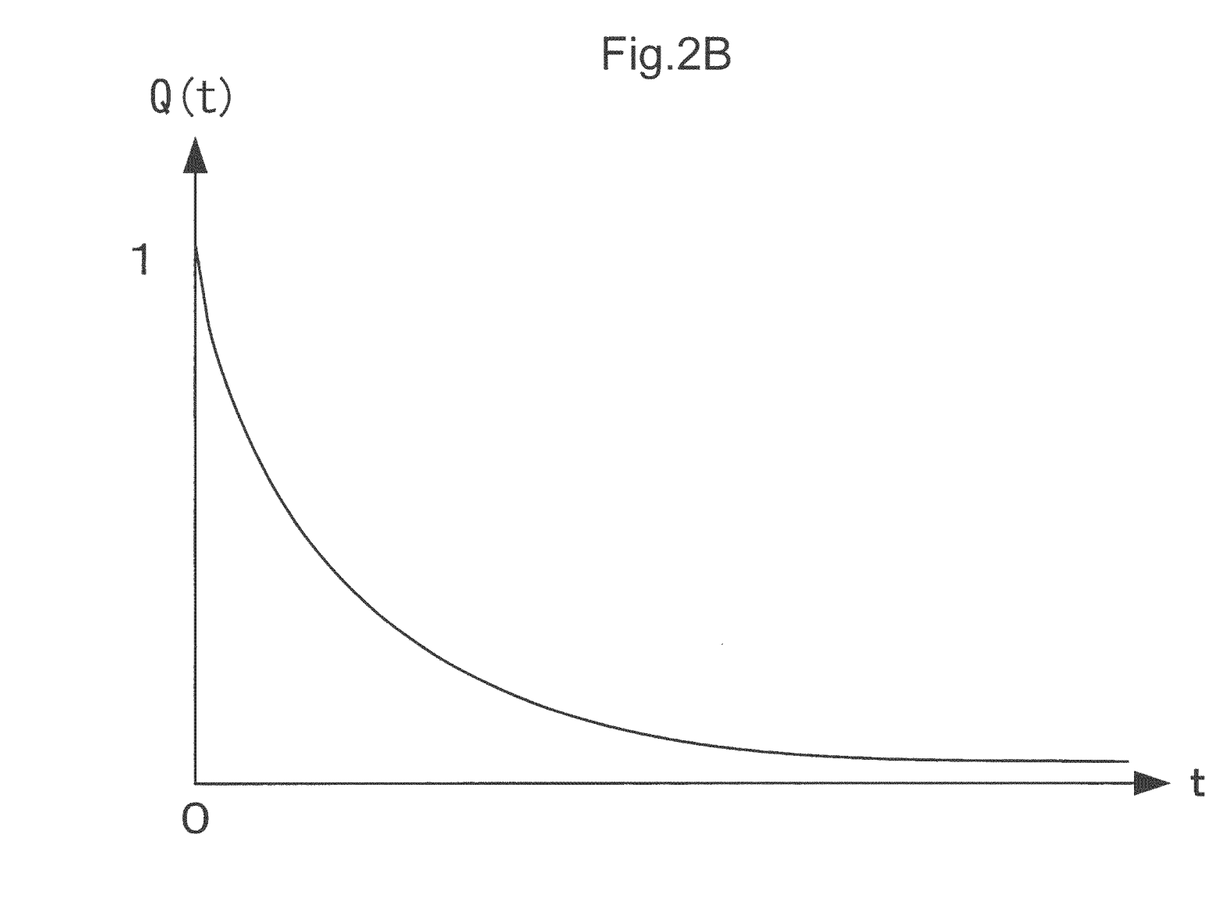
FIG. 2B is a chart illustrating a specific example of non-appearance probability.

FIG. 2A and FIG. 2B each illustrate a specific example of the probability Q(t). FIG. 2A illustrates changes of Q(t) with respect to the time t in which a distance from an imaging range of the camera A to an imaging range of the camera B is long, and FIG. 2B illustrates changes of Q(t) with respect to the time t in which the distance from the imaging range of the camera A to the imaging range of the camera B is shorter than that of FIG. 2A.

Referring to FIG. 2A and FIG. 2B, in the case of the time t=0, Q(t) is 1 in both figures. The reason is that when the imaging range of the camera A and the imaging range of the camera B are not overlapped, a person to be tracked is not considered to appear in a video of the camera B at a moment of exiting and disappearing from the camera A.

Thereafter, with an increase of t, Q(t) decreases. However, the case of FIG. 2B is larger than the case of FIG. 2A in the decreasing rate of Q(t). The reason is that the distance from the imaging range of the camera A to the imaging range of the camera B is shorter in the case of FIG. 2B than in the case of FIG. 2A, and therefore it is conceivable that it takes a shorter time, in the case of FIG. 2B, for a person to be tracked for a long time to appear in a video of the camera B after exiting and disappearing from a video of the camera A.

In the system according to the present exemplary embodiment, on the basis of such P and Q(t), when P>Q(t) is satisfied, a person appearing in the camera B is determined as a person to be tracked. As described above, when imaging ranges of the camera A and the camera B are close to each other, Q(t) decreases (a decreased width with respect to the time t increases), and therefore, even when P is small, a person appearing in the camera B and a person appearing in the camera A are easily determined as the same person.

On the other hand, when the imaging ranges of the camera A and the camera B are distant from each other, Q(t) increases (a decreased width with respect to the time t decreases), and therefore unless P is sufficiently large, the person appearing in the camera B and the person appearing in the camera A are not determined as the same person. In this case, a value of P is updated by observing the person who continuously appears in the camera B. It is conceivable that when, for example, an image having high resolution or an image having imaging conditions such as a posture, a direction, and the like close to those of an image captured by the camera A is obtained, the value of P is updated by computing again a feature value in which the image is treated as a priority. On the other hand, with each elapsed time, a probability in which a person to be tracked does not appear in a video of the camera B decreases, and therefore a value of Q(t) also decreases. Therefore, when another appropriate person candidate is not present, P>Q(t) is satisfied with time and then a person appearing in the camera B is determined as a person to be tracked.

In the above description, as information that changes a value of Q(t), a distance between imaging ranges of cameras has been cited, but in addition thereto, a plurality of pieces of information that change the value of Q(t) are conceivable. It is conceivable to make a consideration, for example, whether an appearance is made in another camera. When a person does not appear, even with an elapsed time, in a video of another camera reachable from an imaging range of the camera A, a probability in which a person appearing in a video of the camera B is a person to be tracked is high, and therefore a value of Q(t) is allowed to decrease (a decreased width with respect to the time t is increased).

When there is a gateway through which a person to be tracked is able to be directed toward another location between the camera A and the camera B, it is conceivable that a probability in which a person appears in an imaging range of a camera B is low. Therefore, in this case, a value of Q(t) is allowed to increase (a decreased width with respect to the time t is decreased).

Alternatively, when one or more persons appear in a video of the camera A other than a person to be tracked and the one or more other persons appear in a video of the camera B, it is conceivable that a probability in which the person to be tracked also appears in the video of the camera B is high, and therefore a value of Q(t) is allowed to decrease (a decreased width with respect to the time t is increased).

(1.2 System Outline)

(1.2.1 Outline of the Entire System)

Figure 3:
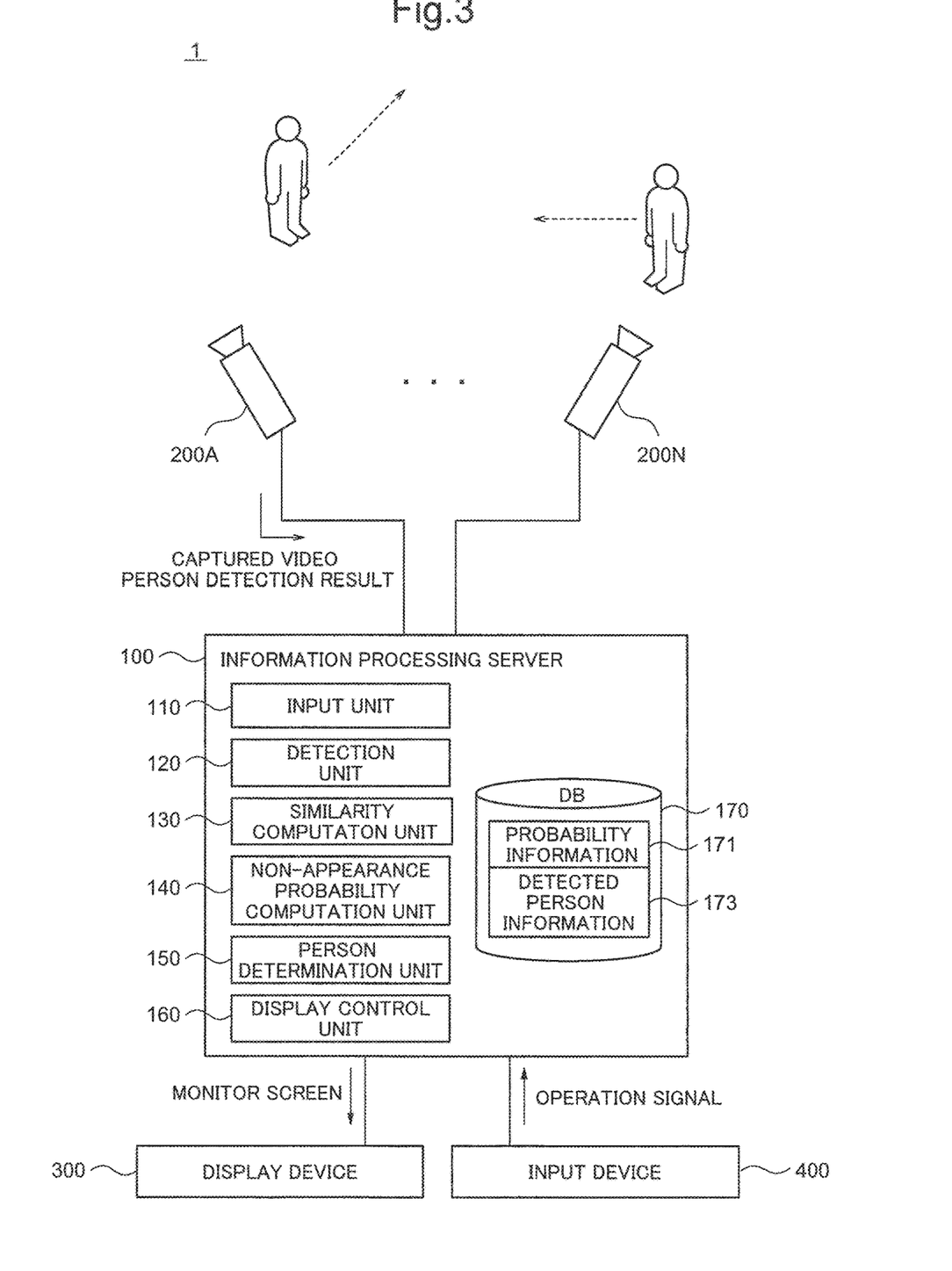
FIG. 3 is a functional block diagram illustrating a schematic configuration of a tracking system according to a first exemplary embodiment.

With reference to FIG. 3, a system configuration of a tracking system 1 equivalent to the information processing system according to the present exemplary embodiment will be described below. FIG. 3 is a block diagram illustrating a system configuration of the tracking system 1.

The tracking system 1 roughly includes an information processing server 100, a plurality of video cameras 200A to 200N that each capture (image) a video (moving image), a display device 300, and an input device 400. The video cameras 200A to 200N are collectively referred to also as the video camera 200.

The tracking system 1 will be described below as a system for tracking a person captured by the video camera 200. However, as described above, it is also conceivable that a tracking target is allowed to be various types of moving bodies such as a car, a bicycle, a motorcycle, an animal, and the like.

The video camera 200 equivalent to an imaging apparatus captures a video and also determines whether or not there is a person in the captured video. In addition thereto, the video camera 200 transmits information such as a location and a feature value related to the person to the information processing server 100, together with the captured video. Through a comparison of the captured video between frames, the video camera 200 can perform person tracking in the video.

It is possible that processing such as detection of a person (detection of an image area related to the person) and extraction of a feature value from a video, person tracking in a camera, and the like is executed on, for example, the information processing server 100 or another information processing device, not illustrated, other than the video camera 200.

The information processing server 100 analyzes the video captured by the video camera 200 and thereby executes various types of processing such as detection of a person, registration of a person to be tracked, tracking of a registered person, and the like.

A case in which person tracking is performed on the basis of a real-time video captured by the video camera 200 is mainly described below, but without limitation thereto, it is also conceivable to perform tracking (analysis), for example, for a video captured by the video camera 200 and then stored on a storage device (e.g., an HDD (Hard Disk Drive), VCR (Video Cassette Recorder), or the like). Further, it is also conceivable to perform tracking by reproducing in a reverse order (by reversely reproducing) the video stored on the storage device. In general, when a certain person has exhibited suspicious behavior, it is necessary to examine via what route the person has moved until the behavior and what behavior the person has exhibited, and therefore it is very useful to enable tracking by such reverse reproduction to be performed.

In person tracking using the information processing server 100, the information processing server 100 outputs a monitor screen to the display device 300 and also inputs operation signals for various types of operation inputs related to the person tracking from the input device 400. More specifically, on the monitor screen displayed in the display device 300, for example, a person to be tracked in a video input from the video camera 200 is displayed as a graphical user interface (GUI). A specific example of the monitor screen displayed by the display device 300 will be described later with reference to FIG. 4.

To provide such a monitor screen to the user, the information processing server 100 functions to determine whether or not a person appearing in a video is a person to be tracked (whether or not the person appearing in the video and the person to be tracked are the same person).

The display device 300 is a display that displays an image on, for example, a liquid crystal, an organic EL (Electro Luminescence), or the like. The monitor screen output from the information processing server 100 is displayed by the display device 300 as describe above.

The input device 400 is a device for inputting various pieces of information by the user. For example, a pointing device, including a mouse, a touch pad, or a touch panel, a keyboard, and the like correspond to the input device 400.

Various types of configurations are conceivable for the information processing server 100, the display device 300, and the input device 400. It is also conceivable that the display device 300 and the input device 400 are realized as one client device. Alternatively, it is possible to realize functions possessed by the information processing server 100, the display device 300, and the input device 400 using four or more information processing devices. When the display device 300 and the input device 400 are realized as one client device, a part of functions of the information processing device 100 according to the present exemplary embodiment may be included in the client device.

(1.2.2 Functional Configuration of Information Processing Server 100)

A configuration of the information processing server 100 according to the present exemplary embodiment will be described below. The information processing server 100 includes, as illustrated in FIG. 3, an input unit 110, a detection unit 120, a similarity computation unit 130, a non-appearance probability computation unit 140, a person determination unit 150, a display control unit 160, and a datadase (DB) 170. A function of the information processing server 100 may be realized using a plurality of information processing devices (computers).

The input unit 110 outputs a video received from the video camera 200 to the display control unit 160 to display the video on the display device 300. Further, the input unit 110 registers information of a person detection result received in the same manner from the video camera 200 on the DB 170 as detected person information 173. The detected person information 173 registered on the DB 170 by the input unit 110 includes information of a feature value of a person detected by the video camera 200.

The detection unit 120 detects, on the basis of the detected person information 173 indicating the person detection result for the video input from the video camera 200, whether or not a person appears in the video. When a person appears in the input video, the detection unit 120 transmits the fact to the similarity computation unit 130 and the non-appearance probability computation unit 140.

The similarity computation unit 130 computes similarity between a feature value of a person to be processed (e.g., a person appearing in a video displayed on the display device 300) and a feature value of a person to be tracked (a person caught by the video camera 200 before that time), using the feature value registered as the detected person information 173. When the similarity is high, a probability in which both persons are the same person is high. Therefore, the similarity computation unit 130 can use the similarity as a probability P in which the both persons are the same person, as described in the above "1.1".

A feature value related to a person to be processed (a person appearing in the video camera 200 to be processed) is updated, as needed, with a movement of a person (a change in the size of the person on the video, a change in the posture and direction of the person, or the like). Therefore, the similarity computation unit 130 computes similarity, as needed, on the basis of an updated feature value.

The non-appearance probability computation unit 140 computes a probability (non-appearance probability) in which a person to be tracked has not yet appeared in an imaging range to be processed. The probability computed by the non-appearance probability computation unit 140 decreases with an increase in an elapsed time t from a time when the person to be tracked has exited and disappeared from a video of the video camera 200 and is equivalent to Q(t) described in the above "1.1". Q(t) can be changed according to information such as a distance between an imaging range of the video camera 200 where a person to be tracked has finally exited and disappeared and an imaging range of the video camera 200 to be processed, whether or not an appearance is made in another video camera 200, and whether or not a person located in a vicinity of the person to be tracked has already appeared in a video of the video camera 200 to be processed.

The person determination unit 150 compares a probability P equivalent to the similarity computed by the similarity computation unit 130 and a non-appearance probability Q(t) computed by the non-appearance probability computation unit 140. The person determination unit 150 determines, on the basis of the comparison result, whether or not the person appearing in the video camera 200 to be processed is the same as the person to be tracked. More specifically, as described above, when P>Q(t) is satisfied, the person determination unit 150 can determine the person appearing in the video camera 200 to be processed as the person to be tracked. On the other hand, when P<Q(t) is satisfied, the person determination unit 150 can determine that a probability in which the person appearing in the video camera 200 to be processed is the same as the person to be tracked is low.

The display control unit 160 generates a monitor screen including a video of the video camera 200 input by the input unit 110, a GUI indicating a same person determination result (i.e., whether to be a person to be tracked) by the person determination unit 150, and others. The display control unit 160 outputs the generated monitor screen to the display device 300.

Figure 4:
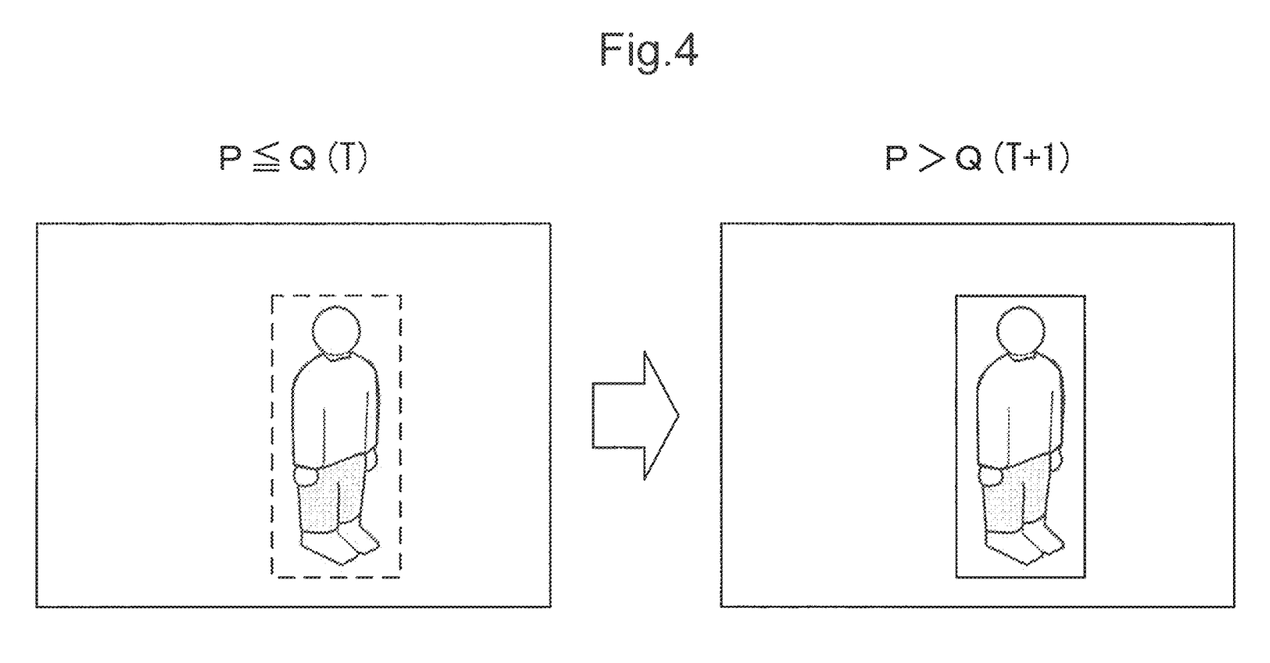
FIG. 4 is a diagram illustrating a specific example of a display screen.

A specific example of the monitor screen generated by the display control unit 160 is described with reference to FIG. 4. Since a probability P is larger than a predetermined threshold, a probability in which a person is determined as the same person is high, but when it is difficult to perform a determination for the same person since the probability P is smaller than Q(t), it is possible that a state (tentative association state) of the person is indicated using a rectangle of a dotted line as illustrated on the left side of FIG. 4 and when P has become larger than Q(t), the rectangle surrounding the person is surrounded with a solid line as illustrated on the right side of FIG. 4 to notify the user of the fact that the person appearing in a video has been determined as a person to be tracked. In this case, when another person more likely to be the person to be tracked appears in the video of the video camera 200, it is conceivable that the person to be tentatively associated (the person indicated to the user using a rectangle of a dotted line) is shifted.

The DB 170 manages probability information 171 and detected person information 173. The probability information 171 is information such as a function to compute a non-appearance probability Q(t) for which specific examples have been illustrated in FIG. 2A and FIG. 2B. The non-appearance probability computation unit 140 provides information such as an elapsed time t and the like to the probability information 171 to compute a value of the non-appearance probability Q(t).

The detected person information 173 is information on a person captured and detected by the video camera 200. The detected person information 173 includes information about via which route a movement has been made, a feature value for a detected person, and the like.

(1.3 Flow of Processing)

Figure 5:
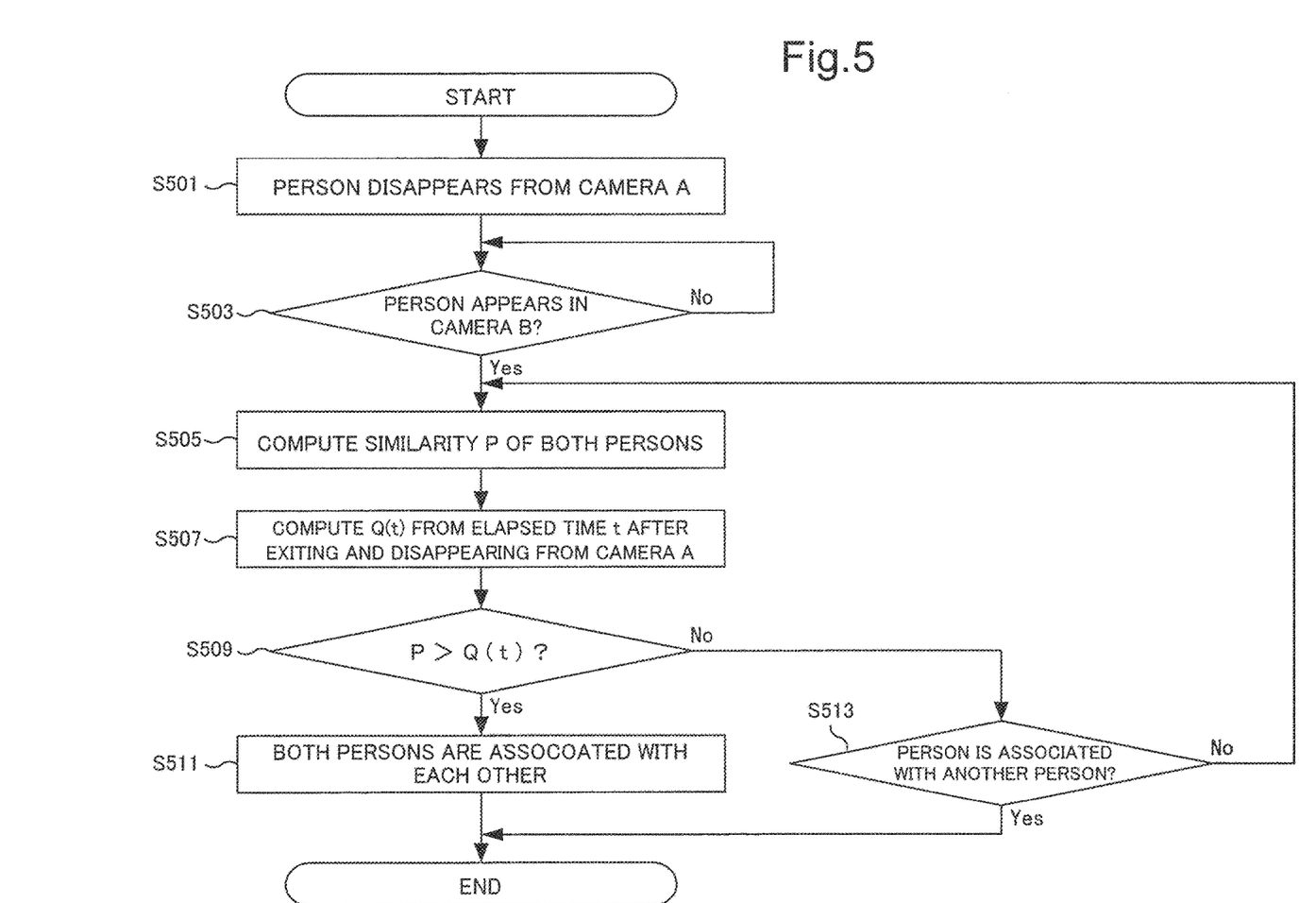
FIG. 5 is a flowchart illustrating a flow of processing executed by an information processing server illustrated in FIG. 1.

Next, a flow of processing of the information processing server 100 will be described with reference to FIG. 5. FIG. 5 is a flowchart illustrating a flow of processing of the information processing server 100 according to the present exemplary embodiment.

Respective processing steps to be described below are executable by changing orders optionally or in parallel unless a contradiction in the processing contents occur, and another step may be added between the respective processing steps. Further, a step described as a single step for convenience is executable by being divided into a plurality of steps, and steps described as a plurality of divided steps for convenience are executable as a single step.

Initially, the detection unit 120 detects, on the basis of information from the video camera 200 received in the input unit 110, that a person to be tracked has exited and disappeared from a video captured by the video camera 200 (hereinafter, this video camera 200 will be referred to also as the "camera A") (S501). When the person to be tracked has exited and disappeared, the non-appearance probability computation unit 140 measures an elapsed time thereafter.

The detection unit 120 determines whether or not a person has appeared in a video of the video camera 200 (hereinafter, this video camera 200 will be referred to also as the "camera B") reachable by the person from an imaging area of the camera A (S503). When the person to be tracked has appeared in the camera B (Yes in S503), the similarity computation unit 130 reads a feature value on the basis of an image of the person to be tracked captured by the camera A or before that time and a feature value of the target person having appeared in the camera B from the detected person information 173 of the DB 170 and computes similarity of both persons. The similarity computation unit 130 determines a probability P in which the both persons are the same person from the similarity (S505).

On the other hand, the non-appearance probability computation unit 140 computes an elapsed time t after the person to be tracked has exited and disappeared from the image of the camera A and computes, on the basis of the elapsed time and the probability information 171 stored on the DB 170, a probability Q(t) in which the person to be tracked appears in a video of the camera B at the elapsed time t (S507).

The person determination unit 150 compares the probability P computed in the similarity computation unit 130 and Q(t) computed in the non-appearance probability computation unit 140 (S509). As a result, when P is larger than Q(t) (Yes in S509), the person appearing in the camera B can be determined to be the same as the person to be tracked.

Therefore, the person determination unit 150 associates both persons as the same person and then continues tracking (S511).

On the other hand, when P is equal to or smaller than Q(t) (No in S509), the person determination unit 150 determines whether or not another person (a person other than the person to be processed) appearing in the camera B or each person appearing in a video being captured by another video camera 200 at the current time has been associated with the person to be tracked (has been determined to be the same person) (S513). When another person has been associated with the person to be tracked (Yes in S513), the person to be processed appearing in the camera B is not the person to be tacked and then the processing is terminated. When any person of respective persons appearing in each video at the current time has not yet been associated with the person to be tracked (No in S513), the processing is returned to S505 and then repeated again on the basis of a newly extracted feature value and an elapsed time.

(1.4 Hardware Configuration)

One example of a hardware configuration in which the information processing server 100 described above is realized using a computer will be described with reference to FIG. 6. As described above, a function of the information processing server 100 can be also realized using a plurality of information processing devices.

Figure 6:
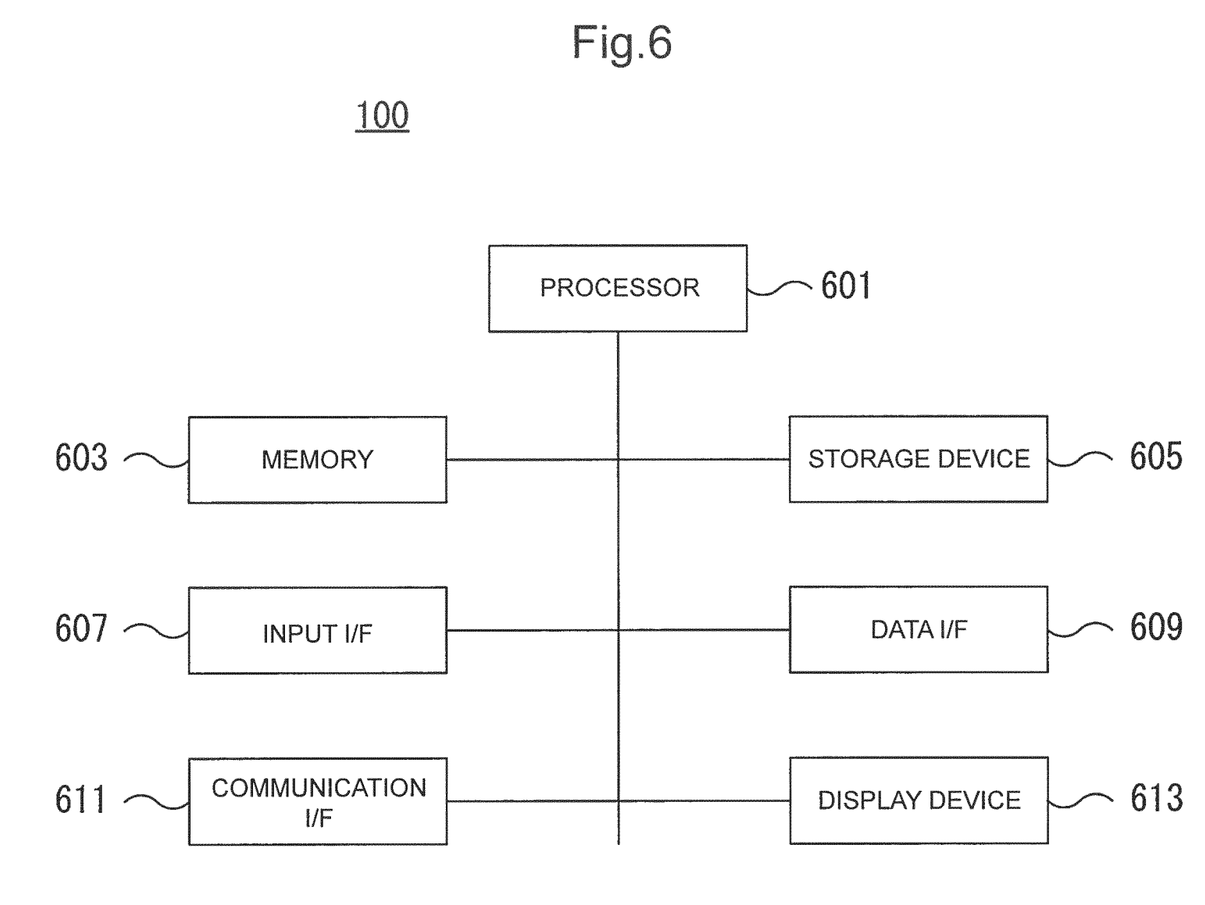
FIG. 6 is a block diagram illustrating a configuration of hardware where the information processing server illustrated in FIG. 1 is mountable.

As illustrated in FIG. 6, the information processing server 100 includes a processor 601, a memory 603, a storage device 605, an input interface (I/F) 607, a data I/F 609, a communication I/F 611, and a display device 613.

The processor 601 executes a program stored on the memory 603 to control various types of processing in the information processing server 100. For example, processing for the input unit 110, the detection unit 120, the similarity computation unit 130, the non-appearance probability computation unit 140, the person determination unit 150, and the display control unit 160 described in FIG. 3 can be realized as a program mainly operating on the processor 601 by being temporarily stored on the memory 603.

The memory 603 is, for example, a storage medium such as a RAM (Random Access Memory) or the like. The memory 603 temporarily stores program codes of a program executed by the processor 601 and data necessary upon executing the program. In a storage area of the memory 603, for example, a stack area necessary during program execution is secured.

The storage device 605 is a non-volatile storage medium such as a hard disk, a flash memory, or the like. The storage device 605 stores an operating system, various types of programs for realizing the input unit 110, the detection unit 120, the similarity computation unit 130, the non-appearance probability computation unit 140, the person determination unit 150, and the display control unit 160, and various pieces of data including probability information 171 and detected person information 173 stored as the DB 170. The programs and the pieces of data stored on the storage device 605 are loaded on the memory 603 as needed and referred to from the processor 601.

The input I/F 607 is a device for receiving an input from the user. The input device 400 described in FIG. 3 can be also realized using the input I/F 607. Specific examples of the input I/F 607 include a keyboard, a mouse, a touch panel, and the like. The input I/F 607 may be connected with the information processing server 100 via an interface such as a USB (Universal Serial Bus) or the like.

The data I/F 609 is a device for inputting data from the outside of the information processing server 100. Specific examples of the data I/F 609 include a drive device and the like for reading pieces of data stored on various types of storage media. It is also conceivable that the data I/F 609 is disposed outside the information processing server 100. In this case, the data I/F 609 is connected with the information processing server 100 via an interface such as a USB or the like.

The communication I/F 611 is a device for performing wired or wireless data communications to a device outside the information processing server 100, such as the video camera 200 or the like. It is also conceivable that the communication I/F 611 is disposed outside the information processing server 100. In this case, the communication I/F 611 is connected with the information processing server 100 via an interface such as a USB or the like.

The display device 613 is a device for displaying various pieces of information. The display device 300 described in FIG. 1 can be also realized using the display device 613. Specific examples of the display device 613 include, for example, a liquid crystal display, an organic EL display, and the like. The display device 613 may be disposed outside the information processing server 100. In this case, the display device 613 is connected with the information processing server 100 via, for example, a display cable, or the like.

(1.5 Advantageous Effects According to the Present Exemplary Embodiment)

As described above, in the tracking system 1 according to the present exemplary embodiment, not only similarity of a feature value of a person image appearing in a video of the video camera 200 but also a non-appearance probability on the basis of an elapsed time after exiting and disappearing from a previous video are taken into account, and identicalness of the person is determined (the person is tracked). Thereby, even if a feature value having sufficient accuracy is not acquired when a person appears in a video of the camera B after a person to be tracked has exited and disappeared from a video of the camera A, the person can be associated with the person to be tracked when imaging ranges of the camera A and the camera B are close to each other and a probability of an error is low. When a person to be tracked exits and disappears from the camera A and immediately thereafter, a person having a feature value similar to that of the person to be tracked appears although a distance between the camera A and the camera B is long, the person can be prevented from being erroneously associated with the person to be tracked. In other words, it is possible to suitably determine identicalness of moving bodies appearing in a plurality of imaging apparatuses.

2 Second Exemplary Embodiment

Figure 7:
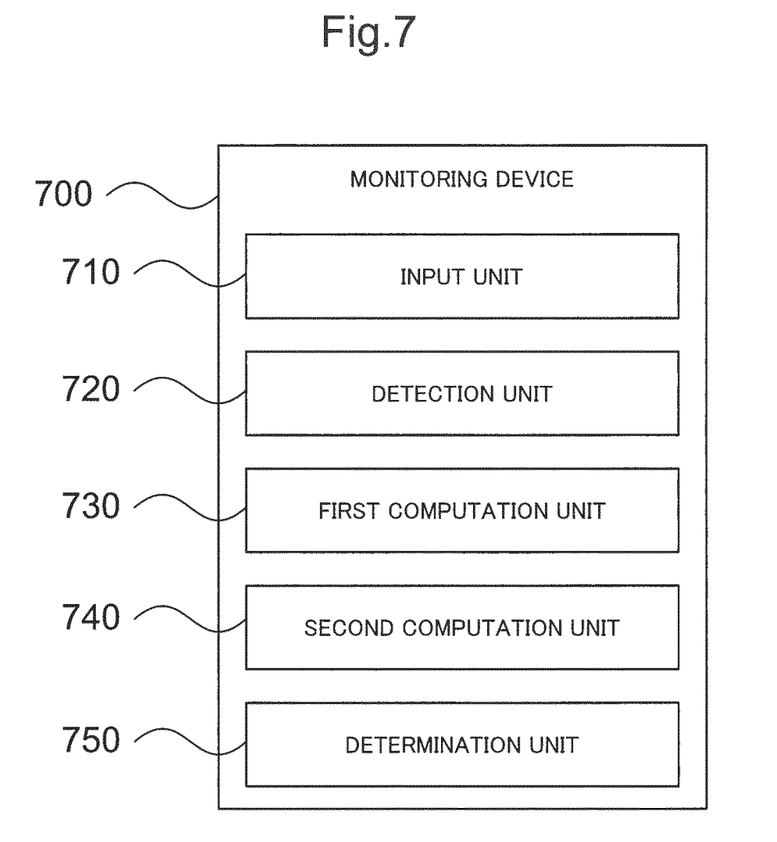
FIG. 7 is a functional block diagram illustrating a schematic configuration of a monitoring device according to a second exemplary embodiment.

With reference to FIG. 7, a second exemplary embodiment will be described below. FIG. 7 is a block diagram illustrating a functional configuration of a monitoring device 700 that is an information processing system. As illustrated in FIG. 7, the monitoring device 700 includes an input unit 710, a detection unit 720, a first computation unit 730, a second computation unit 740, and a determination unit 750. The input unit 710 can receive an input of a video captured by an imaging apparatus (e.g., a video camera) not illustrated.

The detection unit 720 detects a moving body appearing in a video (hereinafter, referred to as a first video) captured by a given video camera (hereinafter, referred to as a first imaging apparatus) among a plurality of imaging apparatuses and a moving body appearing in a video (hereinafter, referred to as a second video) captured by another video camera (hereinafter, referred to as a second imaging apparatus) among the plurality of imaging apparatuses.

The first computation unit 730 derives, on the basis of similarity between the moving body appearing in the first video and the moving body appearing in the second video, a probability (hereinafter, referred to as a first probability) in which both moving bodies are the same moving body.

The second computation unit 740 derives, on the basis of an elapsed time after a moving body has exited and disappeared from the first video, a probability (hereinafter, referred to as a second probability) in which the moving body (the moving body appearing in the first video) does not appear in the second video.

The determination unit 750 determines, on the basis of a comparison between the first probability and the second probability, whether or not the moving body appearing in the first video and the moving body appearing in the second video are the same.

When such mounting is performed, the monitoring device 700 according to the present exemplary embodiment makes it possible to suitably determine identicalness of moving bodies appearing in a plurality of imaging apparatuses.

3 Supplementary Matters

The configurations of the exemplary embodiments may be subjected to combinations or replacements of a part of components. Further, the constitution of the present invention is not limited to only the exemplary embodiments and can be subjected to various modifications without departing from the gist of the present invention.

A part or the whole of the exemplary embodiments can be also described as in the following supplementary notes, but the present invention is not limited to the following. Further, the program of the present invention may be a program that causes a computer to execute the respective operations described in the exemplary embodiments.

(Supplementary Note 1)

An information processing system including: input means for receiving inputs of videos captured by a plurality of imaging apparatuses; detection means for detecting a moving body appearing in a first video captured by a first imaging apparatus among the plurality of imaging apparatuses and a moving body appearing in a second video captured by a second imaging apparatus among the plurality of imaging apparatuses; first computation means for deriving, on the basis of similarity between a feature value of the moving body appearing in the first video and a feature value of the moving body appearing in the second video, a first probability in which both moving bodies are the same; second computation means for deriving a second probability in which the moving body appearing in the first video does not appear in the second video on the basis of an elapsed time after the moving body exits and disappears from the first video; and determination means for determining whether or not the moving body appearing in the first video and the moving body appearing in the second video are the same on the basis of a comparison between the first probability and the second probability.

(Supplementary Note 2)

The information processing system according to Supplementary Note 1, wherein the determination unit determines that the moving body appearing in the first video and the moving body appearing in the second video are the same when the first probability is larger than the second probability.

(Supplementary Note 3)

The information processing system according to Supplementary Note 1 or Supplementary Note 2, wherein the second probability is monotonously non-increasing with respect to an elapsed time after the moving body exits and disappears from the first video.

(Supplementary Note 4)

The information processing system according to Supplementary Note 3, wherein the second probability exhibits a less decreased width with respect to an elapsed time when a distance from an imaging range of the first imaging apparatus to an imaging range of the second imaging apparatus is long than when the distance from the imaging range of the first imaging apparatus to the imaging range of the second imaging apparatus is short.

(Supplementary Note 5)

The information processing system according to any one of Supplementary Note 1 to Supplementary Note 4, the system further including display control means for displaying the second video on a display device, the display control means changing a display method, when the moving body appearing in the second video is the same as the moving body appearing in the first video, into a different display method from a display method used before the moving bodies are determined to be the same moving body.

(Supplementary Note 6)

The information processing system according to any one of Supplementary Note 1 to Supplementary Note 5, wherein the determination means determines whether or not any one of a plurality of moving bodies appearing in the first video at the same time is the same as a part of moving bodies appearing in the second video, and the second computation means lowers the second probability for a moving body that is not associated with the moving body appearing in the second video among the plurality of moving bodies when there is a moving body determined to be the same as the moving body appearing in the second video among the plurality of moving bodies.

(Supplementary Note 7)

An information processing method executed by an information processing system, the method including: a step of receiving inputs of videos captured by a plurality of imaging apparatuses; a step of detecting a moving body appearing in a first video captured by a first imaging apparatus among the plurality of imaging apparatuses and a moving body appearing in a second video captured by a second imaging apparatus among the plurality of imaging apparatuses; a step of deriving, on the basis of similarity between a feature value of the moving body appearing in the first video and a feature value of the moving body appearing in the second video, a first probability in which both moving bodies are the same; a step of deriving a second probability in which the moving body appearing in the first video does not appear in the second video on the basis of an elapsed time after the moving body exits and disappears from the first video; and a step of determining whether or not the moving body appearing in the first video and the moving body appearing in the second video are the same on the basis of a comparison between the first probability and the second probability.

(Supplementary Note 8)

The information processing method according to Supplementary Note 7, the method determining that the moving body appearing in the first video and the moving body appearing in the second video are the same when the first probability is larger than the second probability.

(Supplementary Note 9)

The information processing method according to Supplementary Note 7 or Supplementary Note 8, wherein the second probability is monotonously non-increasing with respect to an elapsed time after the moving body exits and disappears from the first video.

(Supplementary Note 10)

The information processing method according to Supplementary Note 9, wherein the second probability exhibits a less decreased width with respect to an elapsed time when a distance from an imaging range of the first imaging apparatus to an imaging range of the second imaging apparatus is long than when the distance from the imaging range of the first imaging apparatus to the imaging range of the second imaging apparatus is short.

(Supplementary Note 11)

The information processing method according to any one of Supplementary Note 7 to Supplementary Note 10, the method further including a step of displaying the second video on a display device, the step changing a display method, when the moving body appearing in the second video is the same as the moving body appearing in the first video, into a different display method from a display method used before the moving bodies are determined to be the same moving body.

(Supplementary Note 12)

The information processing method according to any one of Supplementary Note 7 to Supplementary Note 11, the method determining whether or not any one of a plurality of moving bodies appearing in the first video at the same time is the same as a part of moving bodies appearing in the second video, and lowering the second probability for a moving body that is not associated with the moving body appearing in the second video among the plurality of moving bodies when there is a moving body determined to be the same as the moving body appearing in the second video among the plurality of moving bodies.

(Supplementary Note 13)

A program that causes a computer to execute: processing for receiving inputs of videos captured by a plurality of imaging apparatuses; processing for detecting a moving body appearing in a first video captured by a first imaging apparatus among the plurality of imaging apparatuses and a moving body appearing in a second video captured by a second imaging apparatus among the plurality of imaging apparatuses; processing for deriving, on the basis of similarity between a feature value of the moving body appearing in the first video and a feature value of the moving body appearing in the second video, a first probability in which both moving bodies are the same; processing for deriving a second probability in which the moving body appearing in the first video does not appear in the second video on the basis of an elapsed time after the moving body exits and disappears from the first video; and processing for determining whether or not the moving body appearing in the first video and the moving body appearing in the second video are the same on the basis of a comparison between the first probability and the second probability.

(Supplementary Note 14)

The program according to Supplementary Note 13, the program causing a computer to determine that the moving body appearing in the first video and the moving body appearing in the second video are the same when the first probability is larger than the second probability.

(Supplementary Note 15)

The program according to Supplementary Note 13 or Supplementary Note 14, wherein the second probability is monotonously non-increasing with respect to an elapsed time after the moving body exits and disappears from the first video.

(Supplementary Note 16)

The program according to Supplementary Note 15, wherein the second probability exhibits a less decreased width with respect to an elapsed time when a distance from an imaging range of the first imaging apparatus to an imaging range of the second imaging apparatus is long than when the distance from the imaging range of the first imaging apparatus to the imaging range of the second imaging apparatus is short.

(Supplementary Note 17)

The program according to any one of Supplementary Note 13 to Supplementary Note 16, the program further causing a computer to execute processing for displaying the second video on a display device and to change changing a display method, when the moving body appearing in the second video is the same as the moving body appearing in the first video, into a different display method from a display method used before the moving bodies are determined to be the same moving body.

(Supplementary Note 18)

The program according to any one of Supplementary Note 13 to Supplementary Note 17, the program causing a computer to determine whether or not any one of a plurality of moving bodies appearing in the first video at the same time is the same as a part of moving bodies appearing in the second video, and to lower the second probability for a moving body that is not associated with the moving body appearing in the second video among the plurality of moving bodies when there is a moving body determined to be the same as the moving body appearing in the second video among the plurality of moving bodies.

This application claims the benefit of priority based on Japanese patent application No. 2013-093849 filed on Apr. 26, 2013, the disclosure of which is incorporated herein in its entirety by reference.

REFERENCE SIGNS LIST

1 Tracking system
100 Information processing server
110 Input unit
120 Detection unit
130 Similarity computation unit
140 Non-appearance probability computation unit
150 Person determination unit
160 Display control unit
171 Probability information
173 Detected person information
200 Video camera
300 Display device
400 Input device
601 Processor
603 Memory
605 Storage device
607 Input interface
609 Data interface
611 Communication interface
613 Display device
700 Monitoring device
710 Input unit
720 Detection unit
730 First computation unit
740 Second computation unit
750 Determination unit

The invention claimed is:

1. An information processing system comprising:
at least one memory storing instructions; and
at least one processor configured to execute the instructions to:
receive inputs of videos captured by a plurality of imaging apparatuses; and
determine whether a first moving body appearing in a first video captured by a first imaging apparatus among the plurality of imaging apparatuses and a second moving body appearing in a second video captured by a second imaging apparatus among the plurality of imaging apparatuses are the same based on a similarity between the first moving body appearing in the first video and the second moving body appearing in the second video and an elapsed time from a first time point when the first moving body disappears from the first video;
wherein in determining whether the first moving body and the second moving body are the same, the at least one processor is further configured to execute the instructions to:
when it is determined that the first moving body can reach, within the elapsed time, an imaging range of a third imaging apparatus from an imaging range of the first imaging apparatus, but does not appear, even after the elapsed time from the first time point, in a third video captured by the third imaging apparatus, decrease a second index value.

2. The information processing system according to claim 1, wherein the at least one processor is further configured to execute the instructions to determine that the first moving body and the second moving body are the same when a first index value indicating the similarity is larger than the second index value indicating that the first moving body does not appear in the second video at a second time point when the second moving body appears in the second video.

3. The information processing system according to claim 2, wherein the first index value is a first probability indicating that both moving bodies are the same and the second index value is a second probability indicating that the first moving body does not appear in the second video at the second time point when the second moving body appears in the second video.

4. The information processing system according to claim 1, wherein the processor is further configured to:
display the second video on a display device.

5. The information processing system according to claim 4, wherein the processor is further configured to:
display, on the display device, a screen for presenting a result of the determination indicating whether or not the first moving body and the second moving body are the same.

6. The information processing system according to claim 5, wherein the processor is further configured to:
change a display method, when the second moving body appearing in the second video is determined the same as the first moving body appearing in the first video, into a different display method from a display method used before the moving bodies are determined to be the same moving body.

7. An information processing method performed by at least one computer, the method comprising:
receiving inputs of videos captured by a plurality of imaging apparatuses; and
determining whether a first moving body appearing in a first video captured by a first imaging apparatus among the plurality of imaging apparatuses and a second moving body appearing in a second video captured by a second imaging apparatus among the plurality of imaging apparatuses are the same based on a similarity between the first moving body appearing in the first video and the second moving body appearing in the second video and an elapsed time from a first time point when the first moving body disappears from the first video;

wherein determining whether the first moving body and the second moving body are the same comprises:
when it is determined that the first moving body can reach, within the elapsed time, an imaging range of a third imaging apparatus from an imaging range of the first imaging apparatus, but does not appear, even after the elapsed time from the first time point, in a third video captured by the third imaging apparatus, decreasing a second index value.

8. The image processing method according to claim 7, further comprising:
determining that the first moving body and the second moving body are the same when a first index value indicating the similarity is larger than the second index value indicating that the first moving body does not appear in the second video at a second time point when the second moving body appears in the second video.

9. The image processing method according to claim 8, wherein the first index value is a first probability indicating that both moving bodies are the same and the second index value is a second probability indicating that the first moving body does not appear in the second video at the second time point when the second moving body appears in the second video.

10. The image processing method according to claim 7, further comprising:
displaying the second video on a display device.

11. The image processing method according to claim 10, wherein:
displaying, on the display device, a screen for presenting a result of the determination indicating whether or not the first moving body and the second moving body are the same.

12. The image processing method according to claim 11, wherein:
changing a display method, when the second moving body appearing in the second video is determined the same as the first moving body appearing in the first video, into a different display method from a display method used before the moving bodies are determined to be the same moving body.

13. A non-transitory computer readable recording medium storing programs, the programs causing at least one computer to perform:
receiving inputs of videos captured by a plurality of imaging apparatuses; and
determining that a first moving body appearing in a first video captured by a first imaging apparatus among the plurality of imaging apparatuses and a second moving body appearing in a second video captured by a second imaging apparatus among the plurality of imaging apparatuses are the same based on a similarity between the first moving body appearing in the first video and the second moving body appearing in the second video and an elapsed time from a first time point when the first moving body disappears from the first video;

wherein determining whether the first moving body and the second moving body are the same comprises:
when it is determined that the first moving body can reach, within the elapsed time, an imaging range of a third imaging apparatus from an imaging range of the first imaging apparatus, but does not appear, even after the elapsed time from the first time point, in a third video captured by the third imaging apparatus, decreasing a second index value.

14. The non-transitory computer readable recording medium according to claim 13, wherein the programs further cause the at least one computer to perform:
determining that the first moving body and the second moving body are the same when a first index value indicating the similarity is larger than the second index value indicating that the first moving body does not appear in the second video at a second time point when the second moving body appears in the second video.

15. The non-transitory computer readable recording medium according to claim 14, wherein the first index value is a first probability indicating that both moving bodies are the same and the second index value is a second probability indicating that the first moving body does not appear in the second video at the second time point when the second moving body appears in the second video.

16. The non-transitory computer readable recording medium according to claim 13, wherein the programs further causes the computer to perform:
displaying the second video on a display device.

17. The non-transitory computer readable recording medium according to claim 16, wherein the programs causes the computer to perform:
displaying, on the display device, a screen for presenting a result of the determination indicating whether or not the first moving body and the second moving body are the same.

18. The non-transitory computer readable recording medium according to claim 17, wherein the programs causes the computer to perform:
changing a display method, when the second moving body appearing in the second video is determined the same as the first moving body appearing in the first video, into a different display method from a display method used before the moving bodies are determined to be the same moving body.

* * * * *